(12) United States Patent
Zuliani

(10) Patent No.: US 10,249,029 B2
(45) Date of Patent: Apr. 2, 2019

(54) RECONSTRUCTION OF MISSING REGIONS OF IMAGES

(71) Applicant: Apple Inc., Cupertino, CA (US)

(72) Inventor: Marco Zuliani, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 424 days.

(21) Appl. No.: 13/954,599

(22) Filed: Jul. 30, 2013

(65) Prior Publication Data

US 2015/0036945 A1 Feb. 5, 2015

(51) Int. Cl.
*G06T 5/00* (2006.01)
*G06T 7/00* (2017.01)

(52) U.S. Cl.
CPC .... *G06T 5/005* (2013.01); *G06T 2207/10024* (2013.01); *G06T 2207/20021* (2013.01)

(58) Field of Classification Search
CPC ........... G06T 5/001; G06T 2207/20192; G06T 2207/20144; G06T 7/0081; G06T 2207/20021; G06T 5/005; G06T 15/503; G06K 9/3266; G06K 9/00664; G06K 9/46; G06K 9/6253; G06K 9/325; G06K 9/4609; G06K 9/4642; G06F 17/30256; H04N 1/622; H04N 1/62
USPC ....................................................... 382/266
See application file for complete search history.

(56) References Cited

U.S. PATENT DOCUMENTS

| | | | |
|---|---|---|---|
| 6,233,279 B1 | 5/2001 | Boon | |
| 6,259,732 B1 | 7/2001 | Lee | |
| 8,160,398 B1 | 4/2012 | Avidan et al. | |
| 8,218,900 B1 | 7/2012 | Avidan et al. | |
| 8,265,424 B1 | 9/2012 | Avidan et al. | |
| 8,270,765 B1 | 9/2012 | Avidan et al. | |
| 8,270,766 B1 | 9/2012 | Avidan et al. | |
| 8,280,186 B1 | 10/2012 | Avidan et al. | |
| 8,280,187 B1 | 10/2012 | Avidan et al. | |
| 8,280,191 B1 | 10/2012 | Avidan et al. | |
| 8,290,300 B2 | 10/2012 | Avidan et al. | |
| 2008/0317375 A1* | 12/2008 | Huan | G06T 5/005 382/274 |
| 2009/0123089 A1* | 5/2009 | Karlov et al. | 382/300 |
| 2009/0208110 A1 | 8/2009 | Hoppe et al. | |

(Continued)

OTHER PUBLICATIONS

Avidan S. et al.: "Seam Carving for Content-Aware Image Resizing" ACM Transactions on Graphics, ACM, US, vol. 26, No. 3, Jul. 1, 2007, XP007904203, pp. 1-9.

*Primary Examiner* — Kim Y Vu
*Assistant Examiner* — Michael J Vanchy, Jr.
(74) *Attorney, Agent, or Firm* — Robert C. Kowert; Meyertons, Hood, Kivlin, Kowert & Goetzel, P.C.

(57) ABSTRACT

Methods and systems for an image construction component capable of generating pixel information for certain regions of an image based on other, existing regions of the image. For example, the image construction component may identify a target block of pixels for which to generate pixel information and then use pixel information for pixels surrounding the target block of pixels in order to identify similar image information within pixels in another part of the image. These identified pixels may then be used in defining the pixel information of the target block of pixels and also used in blending the target block of pixels with the defined pixels surrounding the target block of pixels.

17 Claims, 12 Drawing Sheets

(56) References Cited

U.S. PATENT DOCUMENTS

| | | | |
|---|---|---|---|
| 2010/0046843 A1* | 2/2010 | Ma | G06K 9/00657 |
| | | | 382/224 |
| 2011/0142350 A1 | 6/2011 | Tang et al. | |
| 2011/0299770 A1 | 12/2011 | Vaddadi et al. | |
| 2012/0141045 A1* | 6/2012 | Bae et al. | 382/275 |
| 2013/0051685 A1* | 2/2013 | Shechtman | G06T 11/60 |
| | | | 382/218 |
| 2014/0169667 A1* | 6/2014 | Xiong | G06T 5/005 |
| | | | 382/164 |

* cited by examiner

Determine a target block of pixels within an image, where the target block of pixels is surrounded by blocks of pixels to be defined and blocks of pixels that have existing pixel information 202

Determine visual characteristics of the blocks of pixels that already have pixel information that surround the target block of pixels 204

Search, within the image, for a source block of pixels with surrounding blocks of pixels that are similar to the blocks of pixels surrounding the target block of pixels, where the similarity is based on the visual characteristics of the blocks of pixels surrounding the target block as compared to visual characteristics of the blocks of pixels surrounding the source block 206

Define pixel information for the target block of pixels within the image, where the pixel information for the target block of pixels is based on the source block of pixels 208

*FIG. 2A*

RECONSTRUCTION OF MISSING REGIONS OF IMAGES

BACKGROUND

Under different types of conditions in which an image is taken, there may be one or more portions of the image that are for various reasons poorly defined, undefined, or for some other reason may include regions that are undesirable to a user. For example, when a user takes a panoramic photo, the user typically moves the camera from side to side in order to capture the expanse of the panorama. Often, in taking a panoramic photo, the user does not move the camera in a perfectly horizontal motion, and one result of this imperfect image capture is that the resulting uncropped image may have areas of the image that are undefined for lack of image capture information. In other cases, for any given image, there may be a section of the image that the user would like to remove or redefine. For example, a portrait may have a piece of trash in the background, or the user may simply prefer some region of the image to not be there. In either case, whether there are undefined regions of an image or regions of an image that a user would like to modify, it is difficult using existing image manipulation tools to replace these undesired portions of the image with existing portions of the image in a manner that results in a natural looking and undoctored image.

SUMMARY

In one embodiment, an image construction component may construct a replacement for portions of an image based on other, existing portions of the image. For example, given an image which includes a region for which there is no pixel information, the image construction component may identify a block of pixels along a border between the undefined and defined pixels, where the block of pixels includes undefined pixels, and where the block of pixels is surrounded by both undefined and defined pixels. In this example, the image construction component may calculate a descriptor corresponding to a visual characterization of the surrounding, defined pixels for the identified block of pixels. This descriptor characterizing the surrounding, defined pixels may then be used to search for and identify defined pixels in another, defined region of the image that has similar visual characteristics. The pixels in the other, defined region of the image may then be used in defining the identified block of undefined pixels. Further, these other, defined pixels in the image may be used in blending defined pixels surrounding the newly defined block of pixels with the newly defined block of pixels. This process may be repeated for each remaining, undefined region of the image. The result, after completion of processing, is an image where the previously undefined regions are defined in a manner that appears natural and smoothly blends with the defined regions of the image.

BRIEF DESCRIPTION OF THE DRAWINGS

FIGS. 2A and 2B illustrate flowcharts depicting selected phases of an image construction component, according to some embodiments.

DETAILED DESCRIPTION OF EMBODIMENTS

Figure 1:
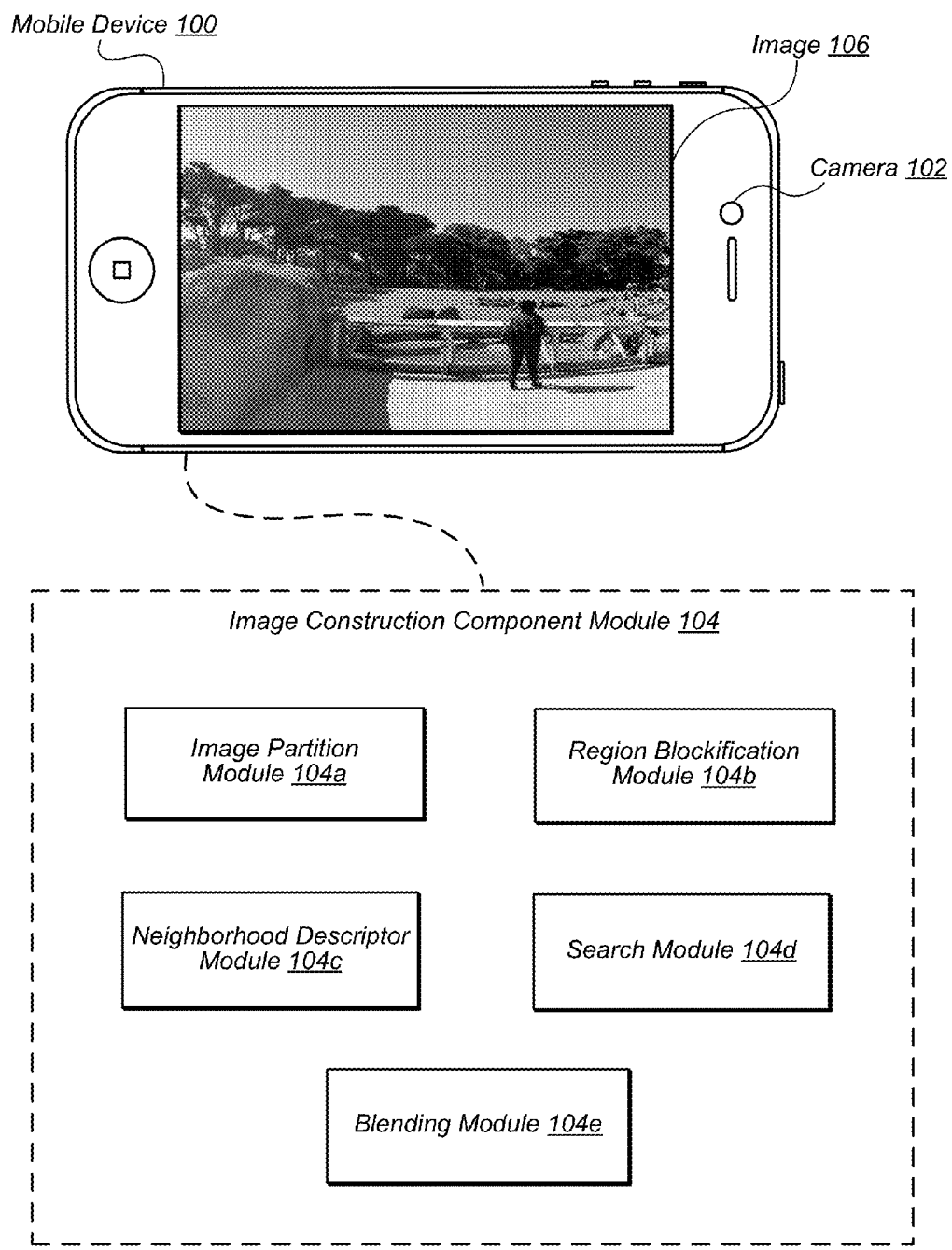
FIG. 1 illustrates a mobile device and an image construction component module, according to some embodiments.

Various embodiments of systems and methods are disclosed for implementing an image construction component capable of constructing and smoothly integrating regions of an image based on other, existing regions of the image.

In many cases, there will be areas of an image that may either be undefined or that a user would prefer to be different. For example, when a user takes a panoramic photo, the user typically moves the camera from side to side in order to capture the expanse of the panorama. Often, in taking a panoramic photo, the user does not move the camera in a perfect, horizontal motion, and one result of this imperfect image capture is that the resulting, uncropped image may have areas of the image that are undefined for lack of image capture information. An example of this may be seen in FIG. 4A, as depicted with the black region of undefined pixels at the top and bottom of the image.

In other cases, any given image may be used as an image upon which the image construction component may operate. For example, an embodiment of an image construction component may be integrated into an image processing tool where a user may select a region or regions of an image that are undesirable for some reason as they presently exist. In this example, the image may be a pastoral scene of a field of grass and trees—with an empty soda can in the middle of the grassy area. The user may select a region that includes the empty soda can and invoke the image construction component in order to replace the selected region with a constructed region. In this example, the user would not have to select an outline of the can or otherwise select the can itself, instead, the user simply selects the entire region, and the entire region is replaced. For example, the user may select the region, and then simply click on a user interface element, such as a button labeled "REPLACE" in order to replace the selected region.

In either type of construction of a region of an image, the operation of the image construction component is similar. In one embodiment, for a given block of pixels to be constructed, the pixels surrounding the block of pixels may be analyzed and characterized so that another part of the image may be found with visual characteristics that are similar to the pixels surrounding the block of pixels to be constructed. In this embodiment, once the other part of the image is found, the pixel information for this other part of the image is used to construct the block of pixels to be constructed and also used to blend the constructed block of pixels with the pixels surrounding the constructed block of pixels.

In other words, an image construction component may construct a replacement for portions of an image based on other, existing portions of the image. For example, given an image which includes a region for which there is no pixel information, the image construction component may identify a block of pixels along the border between the undefined and defined pixels, where the block of pixels includes undefined pixels, and where the block of pixels is surrounded by both undefined and defined pixels.

In this example, the image construction component may calculate a descriptor corresponding to a visual characterization of the surrounding, defined pixels for the identified block of pixels. This descriptor characterizing the surrounding, defined pixels may then be used to search for and identify defined pixels in another, defined region of the image that has similar visual characteristics. The pixels in the other, defined region of the image may then be used in defining the identified block of undefined pixels.

Further, these other, defined pixels in the image may be used in blending defined pixels surrounding the newly defined block of pixels with the newly defined block of pixels. This process may be repeated for each remaining, undefined region of the image. The result, after completion of processing, is an image where the previously undefined regions are defined in a manner that appears natural and smoothly blends with the defined regions of the image.

Detailed Description Considerations

Within the detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

As used herein, the terms "first", "second", and so on are used as labels for nouns that they precede, and do not imply any type of ordering (e.g., spatial, temporal, logical, etc.). For example, in a display environment having multiple display devices, the terms "first" and "second" display devices can be used to refer to any two of the multiple display devices. In other words, the "first" and "second" display devices are not limited to logical display devices 0 and 1.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to".

Example Embodiment of an Image Construction Component

Turning now toward specific embodiments of an image construction component, as noted above, an image construction component may be implemented as part of an image editing system. In other embodiments an image construction component may be implemented within the image processing elements of a camera, such as a traditional point and click camera, a single lens reflex camera, or a mobile device camera.

As depicted in FIG. 1, Mobile Device 100 embodies an implementation of an image construction component in the form of Image Construction Component Module 104. Specifically, Image Construction Component Module 104 provides example computing elements that may be included in an implementation of an image construction component within a mobile device, a stand-alone camera, or an image editing application.

As discussed above, a camera, such as Camera 102, may be used to take a panoramic image, image 106. However, due to an unsteady side-to-side motion across the expanse of the panorama, the initially captured image may include undefined regions for which there is no pixel information or poorly defined pixel information, such as the black region depicted at the top of the image in FIG. 8A.

In such a circumstance, the image construction component may operate to replace the black region of undefined pixels with constructed replacement image data. In this way, the image construction component may take the original image depicted in FIG. 8A and ultimately produce the image depicted in FIG. 8D.

Figure 4:
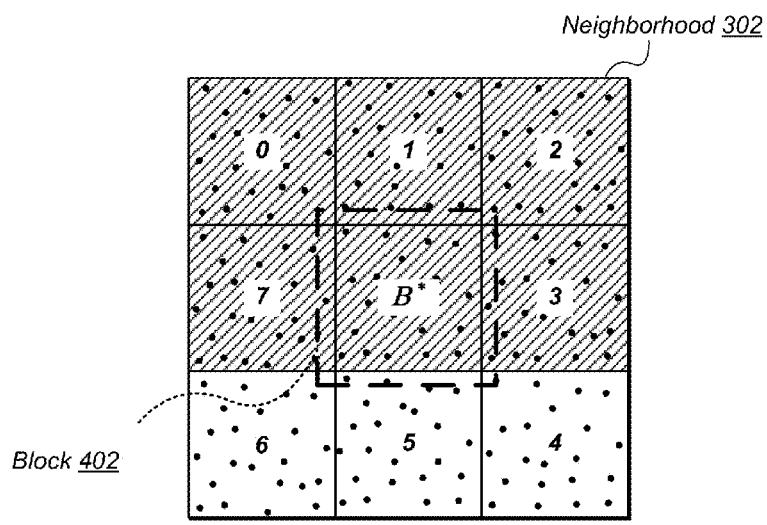
FIG. 4 illustrates a block of pixels surrounded by other blocks of pixels, according to some embodiments.
Figure 5:
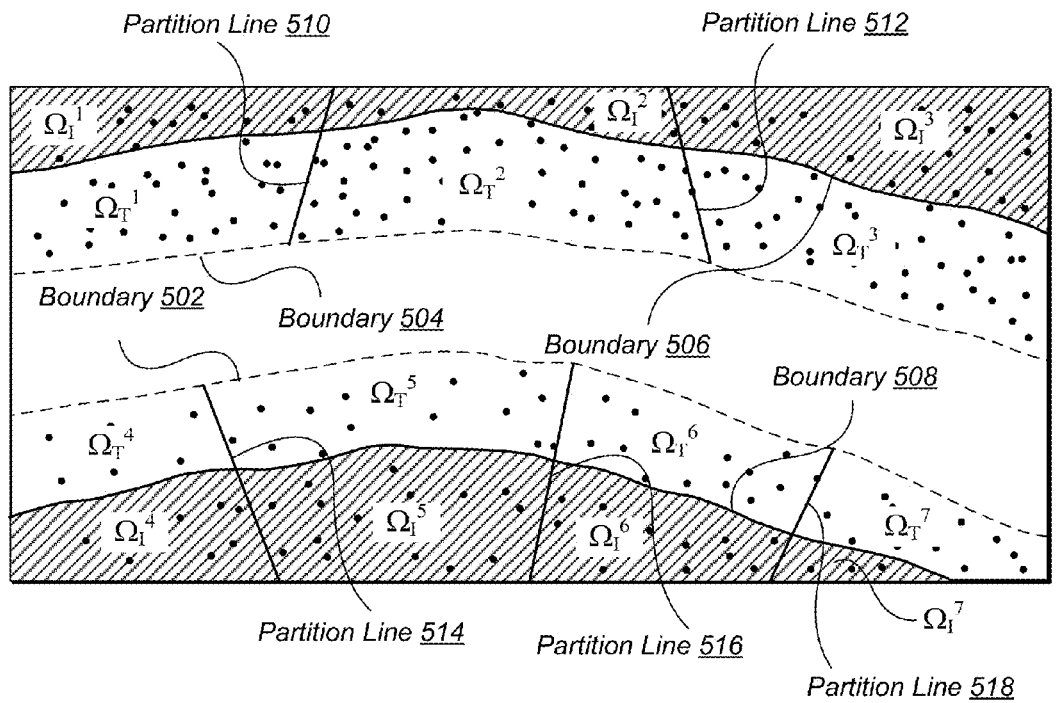
FIG. 5 illustrates an image divided into different regions, according to some embodiments.

In some embodiments, an image may first be divided into one or more partitions, as depicted in FIGS. 4 and 5, and such a partitioning may be accomplished in multiple different ways, as discussed below. In some embodiments, this partitioning may be implemented with an Image Partition Module 104a.

Figure 6:
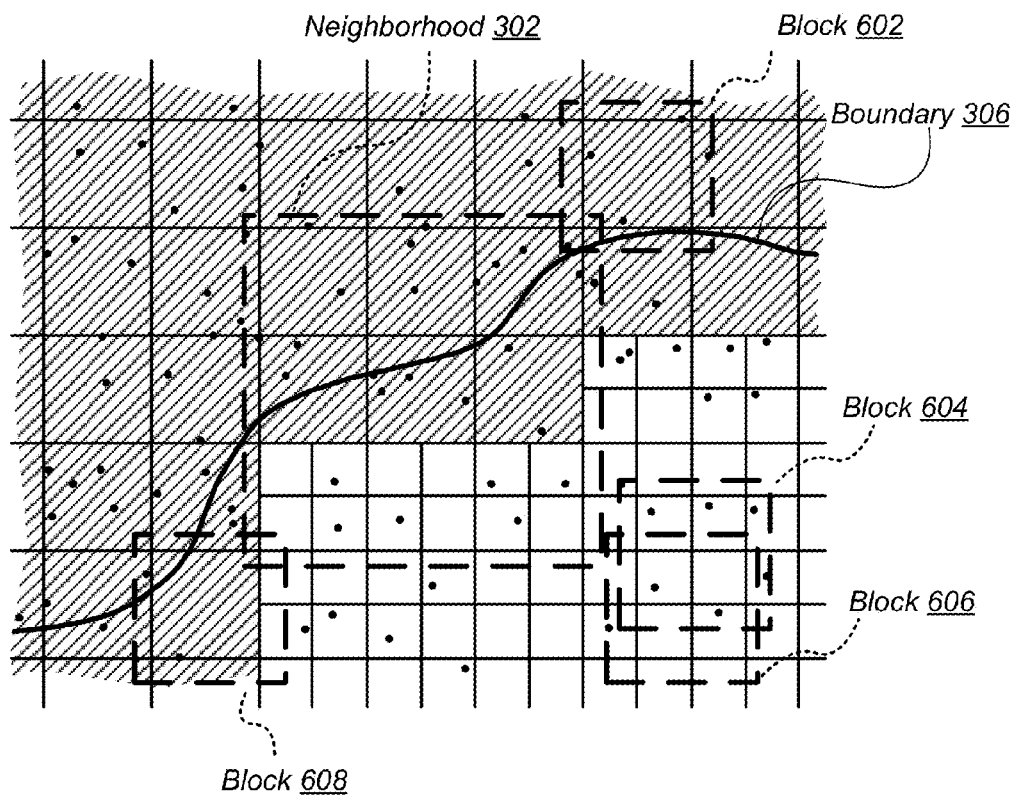
FIG. 6 illustrates a blocks of pixels along a border between undefined and defined pixels of an image, according to some embodiments.

In some embodiments, the image being processed, once it is partitioned, may be further divided into blocks that include both undefined and defined pixels and blocks that only include defined pixels, as depicted in FIG. 6. In some embodiments, this division into blocks, or blockification, may be implemented with a Region Blockification Module 104b.

In some embodiments, once the image construction component has defined the blocks, the image construction component may identify a block of pixels along the border between the undefined and defined pixels, where the block of pixels includes undefined pixels, and where the block of pixels is surrounded by both undefined and defined pixels. In this example, the image construction component may calculate a descriptor corresponding to a visual characterization of the surrounding, defined pixels for the identified block of pixels. In some embodiments, the calculation of a descriptor for the surrounding blocks may be implemented with a Neighborhood Descriptor Module 104c.

In some embodiments, a descriptor characterizing the surrounding, defined pixels may then be used to search for and identify defined pixels in another, defined region of the image that has similar visual characteristics. In some embodiments, the search for a block of pixels as a basis for constructing a block of pixels may be implemented with a Search Module 104d.

In some embodiments, the pixels in the other, defined region of the image may then be used in defining the identified block of undefined pixels, and these other, defined pixels in the image may be used in blending defined pixels surrounding the newly defined block of pixels with the newly defined block of pixels. In some embodiments, the blending of the constructed block of pixels with surrounding blocks may be implemented with a Blending Module 104e.

FIG. 2A provides a high-level overview of a flowchart of an image construction component for constructing portions of an image based on other existing portions of the image, according to some embodiments. As noted elsewhere, the portions of the image to be constructed may be undefined or may be defined portions to be replaced.

In this overview, the image construction component may initially determine a target block of pixels to construct within an image, where the target block of pixels is surrounded by blocks of pixels to be defined and also by blocks of pixels that already have existing pixel information, as depicted at 202. As noted earlier, such a target block may be found along the border between the area to be defined and an already defined are of the image.

As depicted at 204, the image construction component may, once the target block is selected, determine visual characteristics of the blocks of pixels (that already have pixel information) that surround the target block of pixels. These visual characteristics are used in searching for a source block of pixels within the image that is surrounded by blocks of pixels such that the blocks surrounding the source block of pixels is similar to the target block of pixels, as depicted at 206. In this way, the image construction component is more likely to construct the target block of pixels in a way that matches existing visual patterns of the image.

Once the source block of pixels has been determined, as depicted at 208, the image construction component may define, or construct, the pixel information for the target block of pixels within the image where the pixel information is based on the source block of pixels. As discussed in other sections, in some embodiments, the target block of pixels may be an exact copy or a slight variation of the source block. In other embodiments, the target block of pixels may be modified to blend in with the blocks surrounding the target block of pixels. In other embodiments, and as discussed below, the blocks surrounding the target block of pixels instead may be modified to blend in with the newly defined target block of pixels.

Figure 2B:
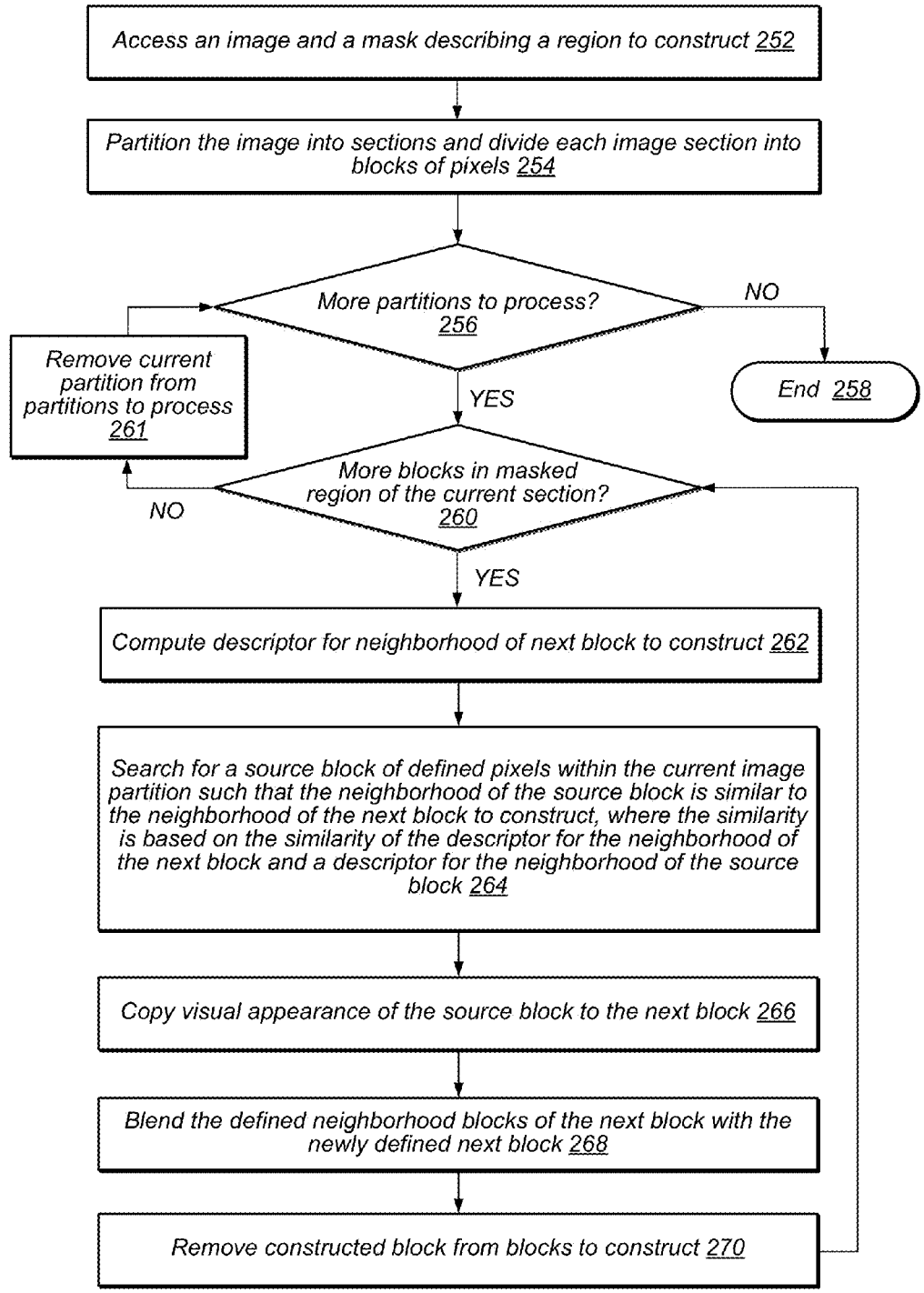

FIG. 2B provides of a flowchart of a specific embodiment of an image construction component for constructing portions of an image based on other existing portions of the image, according to some embodiments.

Figure 3:
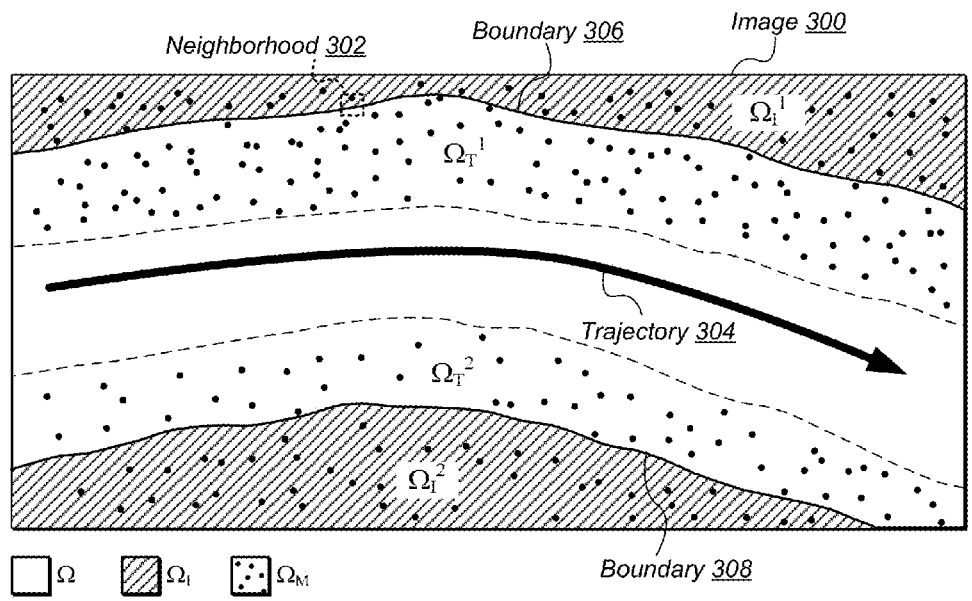
FIG. 3 illustrates an image divided into different regions, according to some embodiments.

In one embodiment, to begin, the image construction component may access an image and a mask describing a region or regions to construct, as depicted at 252. For example, FIG. 3 depicts an image space 300 that has been divided into partitions including $\Omega_T^1$, $\Omega_T^2$, $\Omega_I^1$, and $\Omega_I^2$, where $\Omega_T^1$ and $\Omega_T^2$ represent partitions of the image space where the pixel information is defined and may serve as a training region, hence subscript T, and where $\Omega_I^1$ and $\Omega_I^2$ represent partitions of the image space for which pixel information may be constructed or inpainted, hence subscript I.

In this example, partitions $\Omega_I^1$ and $\Omega_I^2$ may be the result of a user taking a panoramic photo where the camera was moved from side to side according to the trajectory 304 such that image information was not captured for the partitions $\Omega_I^1$ and $\Omega_I^2$.

Also depicted within image space 300 is a group of pixels identified as neighborhood 302. Neighborhood 302, as depicted within FIG. 4, may be further divided into blocks of pixels, such as the eight blocks 0-7 and block B*, or block 402. In this embodiment, each block is a 16×16 square set of pixels; in other embodiments, other shapes or pixel quantity choices for the blocks or neighborhoods may be used.

In order for the image space 300 to be fully defined with pixel information, partitions $\Omega_I^1$ and $\Omega_I^2$ are constructed or inpainted according to the image construction component.

In other embodiments, the image space may be partitioned in different ways, such as the partitioning depicted in FIG. 5. Different partitioning methods are discussed below.

Given a partitioning, such as a partitioning depicted in either FIG. 3 or FIG. 5, the image construction component may divide a given partition into blocks of pixels, such as the eight blocks of pixels depicted in FIG. 4, and blocks 602, 604, and 606 in FIG. 6. In this example, a block to be constructed and a block that serves as a training block are both 16×16 pixels. In other embodiments, the constructed block and the training block may be different shapes or sizes or different shapes or sizes from each other.

An example for how blocks are defined is presented below. In this embodiment, a block to be constructed has at least one undefined pixel and a training block has no undefined pixels. However, in other embodiments, different specifications may be defined for what may serve as a block to be constructed and what may serve as a training block. As seen in FIG. 6, different training blocks may overlap, and all of the training blocks in this example are entirely below boundary 306.

Once the image space has been partitioned and divided into blocks, the image construction component may begin constructing portions of the undefined region a block at a time. In this example, as depicted at 256 of FIG. 2B, and using the partitioning in FIG. 3, the image construction component determines whether there are more partitions to process. At this stage, there are two partitions to process, $\Omega_I^1$ and $\Omega_I^2$, so processing continues to 260. Otherwise, after all partitions are processed and all undefined blocks are constructed, processing would end at 258.

At 258, the image construction component determines whether there are additional blocks in the current partition to process, which in this case, there are, and so processing continues to 262. Otherwise, when all blocks of a given partition have been constructed, the given partition is removed from the partitions to process, as depicted at 261, and processing continues at 256.

At 262, the image construction component computes a descriptor representative of one or more visual characteristics of the defined blocks surrounding the block to be constructed, in this example, B*. In different embodiments, a descriptor may be computed in different ways.

For example, a given block may be represented using a descriptor, $D(B^*) \in \mathbb{R}^{d\,d}$, providing for a descriptor able to capture both a geometrical structure of an image and color information. Further, the descriptor may be composed of the first $[pL^2]$ components of the discrete cosine transform (DCT) for each image plane sampled by a given block. The coefficients may be collected according to a zigzag sampling used in JPEG compression. For example, in a three channel image, the descriptor length for each block is $d=3\lceil pL^2 \rceil$.

This concept may be extended to describe the neighborhood of a block through the concatenation of descriptors for neighboring blocks of a given block, where the neighboring blocks may be referred to according to the their index. For example, referring to FIG. 4, block 0 (zero) may be referred to as $B_0$, and so on. Therefore, a neighborhood descriptor may be specified as, $$D(\mathcal{N}_{(B^*)}) = [D(B_0) \ldots D(B_i) \ldots D(B_n)]^T \in \mathbb{R}^{d\,d|\mathcal{N}_{(B^*)|}}$$

In other words, the descriptor for a neighborhood of B* may be composed of a concatenation of descriptors for each of the surrounding blocks which are defined (contain pixel information).

In other embodiments, the descriptor may be calculated in different ways. For example, $D(\mathcal{N}(B^*))$ may be calculated as an average of the descriptors for the neighboring blocks. This may produce a descriptor that is more compact, but which may not be as descriptive of the visual elements of blocks in the neighborhood.

In other embodiments, in addition to color information, the descriptor may represent one or more vectors for edges within a block, where the edges within a given block are detected with an edge detection algorithm. While such a descriptor may result in a long descriptor, it may be more accurate in detecting patterns within blocks and comparing patterns between blocks.

Once a descriptor has been calculated for the defined blocks surrounding the block to be constructed, B*, the image construction component may search for a training block, $\overline{B}$, within the current partition such that the training block is surrounded with blocks that are similar to the blocks surrounding B*, as depicted at 264. Further, this similarity may be established on the basis of the similarity of the descriptor for $\overline{B}$ as compared to B*. A search may compare a large number of blocks, and an example data structure suitable for this purpose is presented below.

Once the training block $\overline{B}$ has been determined, the visual characteristics of $\overline{B}$, and in particular, the pixel information, may serve as a basis for defining the pixel information of the block to be constructed, B*. In some embodiments, the pixel information is copied exactly, as depicted at 266. In other embodiments, the pixels of block B* may be blended in some way with the neighborhood blocks. Different approaches are discussed below.

Once the pixels for the block to be constructed, B*, have been defined, the image construction component may modify the pixels of the defined blocks surrounding B*, as depicted at 268. Different embodiments for blending the surrounding blocks with B* are discussed below.

At this point, the image construction component has constructed block B*, and processing may continue for the remaining blocks in the partition. Therefore, at this point, the image construction component may remove block B* from blocks in the partition to process, as depicted at 270, and processing may continue at 260.

Once each block in the partition has been constructed, and once each partition has been processed, the original image consisting of undefined regions would have been transformed to an image with those undefined regions replaced with constructed regions based on the original existing regions of the image.

Selection of a Next Block to Construct

As noted above in regard to FIG. 2B, the image construction component, at 262, computes a descriptor and selects a next block to construct. In some embodiments, the image construction component may construct the undefined regions in the next block to construct in a manner that progressively moves the border between the defined regions of an image and the undefined region or regions of an image.

In other words, in some embodiments, a block of undefined pixels adjacent to a block of pixels is selected each time a block to be constructed is selected, and as each block of undefined pixels is constructed, the undefined region of the image shrinks and the border between the defined regions of the image and the undefined region moves closer toward the edge of the image, until the border is the edge of the image and the entire undefined region or regions of the image have been constructed.

Figure 8A:
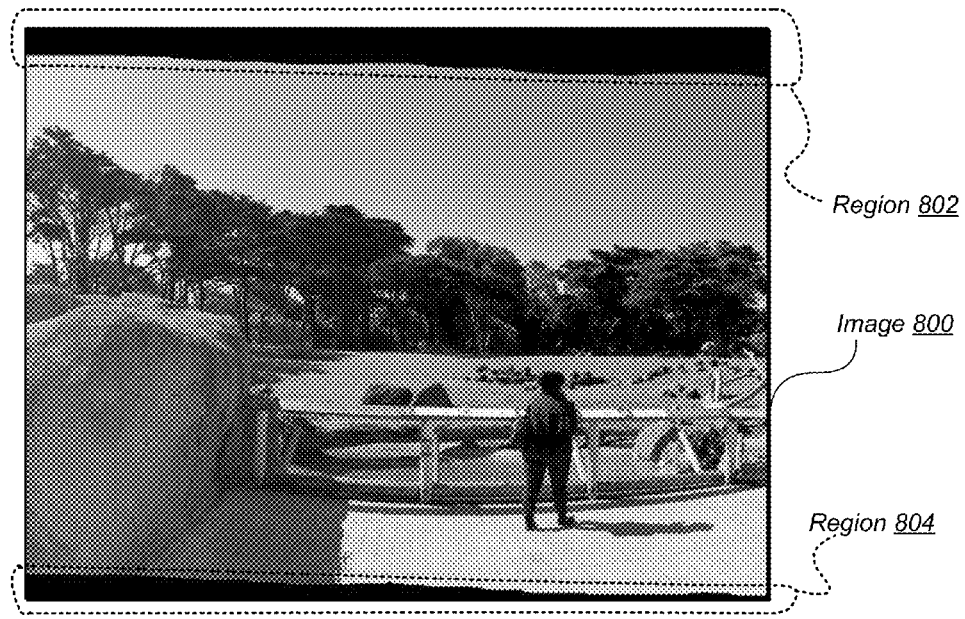
FIGS. 8A-8D illustrate a series of images from an initial image with regions of pixels to be constructed to a final image with all undefined regions of pixels having been constructed, according to some embodiments.

FIGS. 8A-8D and 9A-9D provide two examples of an application of an image construction component to images to construct regions of the images. For example, as illustrated in FIG. 8A, regions 802 and 804 of image 800 include a black region for which there may be no pixel data, and for which the image construction component may construct the pixels based on the defined regions of the image.

Figure 8B:
Figure 8C:
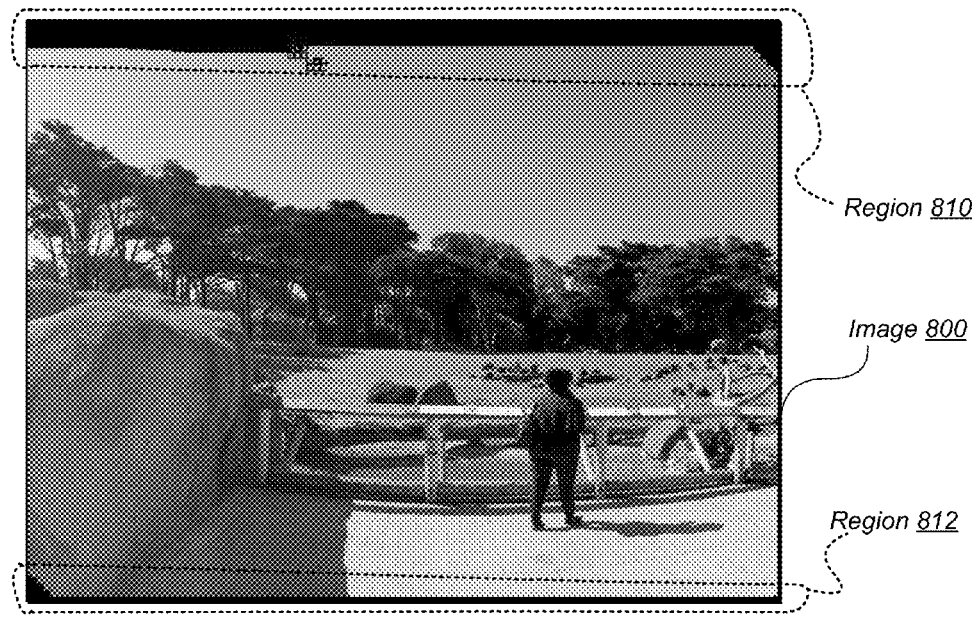
Figure 8D:
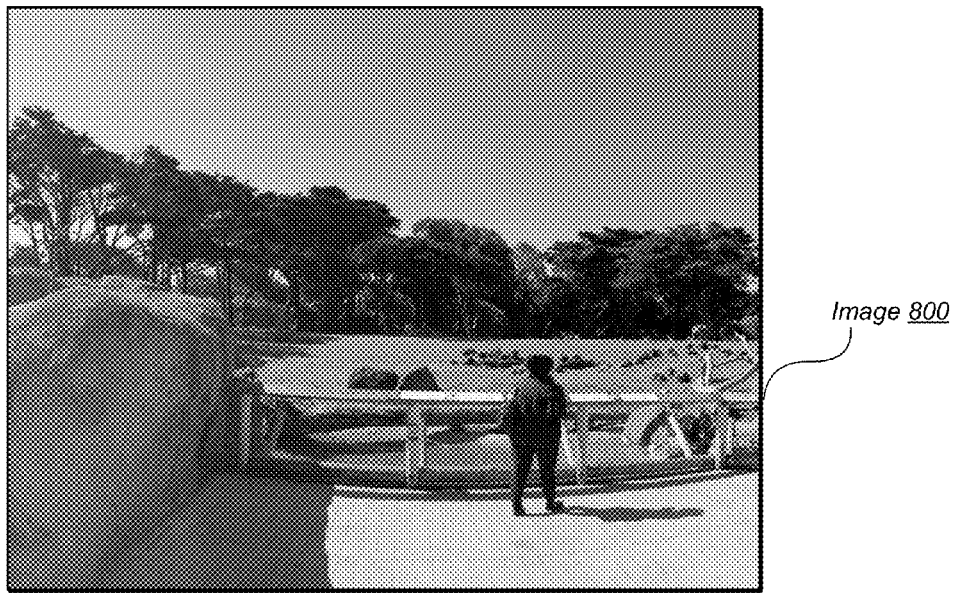

Further, in FIG. 8B, are example depictions of a training neighborhood 806 and a neighborhood 808 surrounding a block to be constructed. As the image construction component constructs blocks within the image 800, the black region or undefined region, gets smaller, as depicted with regions 810 and 812, which are smaller than corresponding regions 802 and 804. Image 800 in FIG. 8D illustrates a fully constructed image. Note that the constructed sky matches the color tones of the existing sky and how the pattern of the decking under the person's feet have been somewhat reproduced in the constructed decking regions.

Figure 9A:
FIGS. 9A-9D illustrate a series of images from an initial image with regions of pixels to be constructed to a final image with all undefined regions of pixels having been constructed, according to some embodiments.
Figure 9B:
Figure 9C:
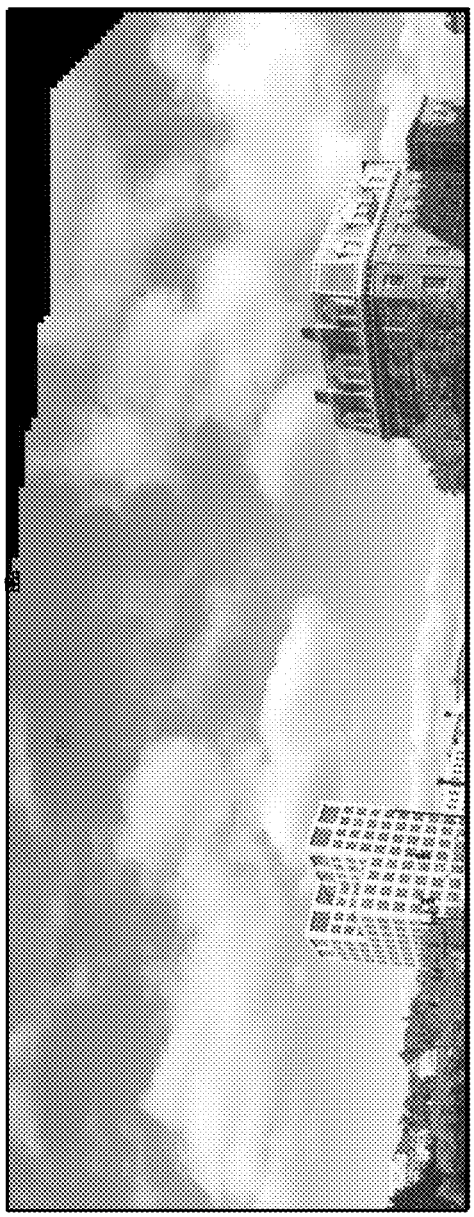
Figure 9D:

FIGS. 9A-9D, similar to FIGS. 8A-8D, illustrate a similar progression from an initial image 9A with regions of undefined pixels to interim images in FIG. 9B and FIG. 9C, to a fully constructed image in FIG. 9D. For different initial images, the relative distance between a training neighborhood and a neighborhood to be constructed may be nearby, such as in FIG. 8B and neighborhoods 806 and 808, or farther apart, such as in FIG. 9A and neighborhoods 902 and 904. In other words, in some embodiments, the training neighborhood and the neighborhood of the block are based on similarity of visual characteristics of the neighborhoods and not proximity between the neighborhoods.

In some embodiments, the image construction component may, for each block $B \in \mathcal{B}(\Omega_I^i; \Delta_I, L)$, construct a neighborhood for B as the set of blocks that either belong to the training set or were previously constructed. In this example, more specifically, $$B_i \in \mathcal{N}(B) \Leftrightarrow (B_i \in \Omega_T^i) \vee B_{i-1}.$$

In this example, note that if block $B_{i-1}$ was constructed at a previous iteration, it may belong to a different region to be constructed. In this way, the image construction component may cope with any boundaries between adjacent regions to be constructed.

The image construction component may then select a subset, $\mathcal{B}_{max} \subset \mathcal{B}(\Omega_I^i; \Delta_I, L)$, which may be composed of blocks with the largest neighborhoods. In other words, blocks that are undefined, but with a most defined surrounding blocks. As discussed above, a size for a neighborhood may correspond to its cardinality.

In this example, the image construction component may randomly select an element from $\mathcal{B}_{max}$ to be the next block to be constructed. In other words, once the neighborhood sizes have been determined for each undefined block, the undefined blocks with the largest neighborhoods are in $\mathcal{B}_{max}$, and any one of those blocks may be randomly selected as the next block to construct. In regard to FIG. 2B, the next block referred to at 262 may be determined according to this method.

Image Partitioning Based on Connected Components

As noted above, the image construction component may partition an image in a number of different ways. For example, in one embodiment, the image construction component may partition an image based on an identification of connected components. In another embodiment, the image construction component may partition an image based on clustering.

In regard to a partitioning, a goal of the image construction component is to partition $\Omega_I$, in other words, the region of the image to be constructed or inpainted, into partitions $\{\Omega_I^i\}_{1 \le i \le N}$, where N is the number of partitions, and to associate to each of these partitions a corresponding training partition $\Omega_T^i \leftrightarrow \Omega_I^i$.

In an embodiment where the image construction component divides the region to construct based on connected components, the image construction component may begin with computing a distance transform with respect to $C \backslash \Omega$, where $C=\{(x,y) \in \mathbb{N}^2:(0 \le x \le W-1) \wedge (0 \le y \le H-1)\}$, where W is the width of the image in pixels, where H is the height of the image in pixels.

In other words, C is the set of all pixels, and where $\Omega$ is the region of the image that contains useful pixel information, and where $C \backslash \Omega$ indicates all the pixels, C, of the image except for the pixels not to be constructed, $\Omega$. The region of useful pixel information may include the valid area of a panorama, or the pixels to be retained after removing an object from the image, or the pixels that compose the portion of the image that is not to be restored.

In computing the distance transform, the image construction component may compute, for each pixel $(x, y) \in \Omega$, the smallest distance $d_\Omega(x, y)$ from the region $\Omega_I$.

The image construction component may then define a region $\Omega_M$ to be the region composed of pixels with distance $d_\Omega$ less than or equal than a given threshold plus the region that is to be constructed, in other words, $\Omega_M=\{(x,y) \in \Omega : d_\Omega(x, y) \le T_{\Omega_I}\} \cup \Omega_I$. With respect to FIG. 3, $\Omega_M$ is defined to be the combined regions of $\Omega_T^1$, $\Omega_I^1$, $\Omega_T^2$, and $\Omega_I^2$, in other words, each region of FIG. 3 with polka dots as part of the background pattern.

The image construction component may then identify a partition of $\Omega_M$ generated according to its connected components, $\{\Omega_M^i\}_{1 \le i \le N}$. Note that in some cases, N=1.

Further in this embodiment, for each element $\Omega_M^i$ of the partition, the image construction component may recover a corresponding training region, $\Omega_T^i = \Omega_M^i \cap \Omega_T$, and the region to be constructed, $\Omega_I^i = \Omega_M^i \cap \Omega_I$. These partitions are depicted in FIG. 3, and this type of partitioning may be selected based on the training region being next to a region to be constructed such that these regions present similar visual characteristics.

Image Partitioning Based on Clustering

In other embodiments, the image construction component may base a partitioning of an image on clusters of regions of the image. For example, with respect to FIG. 5, the image construction component may compute a distance transform with respect to $C \backslash \Omega$, where $C=\{(x,y) \in \mathbb{N}^2 : (0 \le x \le W-1) \wedge (0 \le y \le H-1)\}$, where W is the width of the image in pixels, where H is the height of the image in pixels.

In this example, the image construction component may compute, for each pixel $(x, y) \in \Omega$, the smallest distance $d_\Omega(x, y)$ from the region $\Omega_I$. As depicted in FIG. 5, this computation would correspond to defining boundaries 502 and 504.

The image construction component may then define a training region including those regions with defined pixels with a distance $d_\Omega$ which is less or equal to a given threshold, $\Omega_T=\{(x, y)\in\Omega : d_\Omega(x,y)\leq T_\Omega\}$. In other words, the portion of the defined pixels, $\Omega$ (indicated with a white background and including the all-white background and the white background and polka dots), that are within a threshold distance from the border between the defined pixels and the pixels to be constructed. As depicted in FIG. 5, region $\Omega_T$ is the region between boundaries 504 and 506 and the region between boundaries 502 and 508, or the regions with a white background and a polka dot pattern.

The image construction component may then form the region $\Omega_M=\Omega_T\cup\Omega_I$, as depicted in FIG. 5 as the region with a polka dots—including both the region with a white background and polka dots and the region with a striped background and polka dots.

The image construction component may then cluster the pixels in $\Omega_M$ according to their position. For example, this can be done using different types of algorithms, including Lloyd's algorithm, where the pixel positions may be used to compute a similarity measure for clustering. Regardless of the type of clustering algorithm used, the result is a partition $\{\Omega_M^i\}_{1\leq i\leq N}$, where N is the number of partitions, which in this example is seven (7). As depicted within FIG. 5, the seven partitions of the $\Omega_M$ region is created according to partition lines 510, 512, 514, 516, and 518.

In this example, the image construction component may, for each element $\Omega$ of a given partition, recover a corresponding training region, represented as, $\Omega_T^i=\Omega_M^i\cap\Omega_T$, and region to be constructed, $\Omega_I^i=\Omega_M^i\cap\Omega_I$. Training partitions $\Omega_T^1$, $\Omega_T^2$, $\Omega_T^3$, $\Omega_T^4$, $\Omega_T^5$, $\Omega_T^6$, and $\Omega_T^7$, and the respective corresponding partitions to be constructed, $\Omega_I^1$, $\Omega_I^2$, $\Omega_I^3$, $\Omega_I^4$, $\Omega_I^5$, $\Omega_I^6$, and $\Omega_I^7$ are depicted within FIG. 5, where $\Omega_T^1$ corresponds to $\Omega_I^1$, and so on.

At this point, the image construction component may use these partitions in constructing each region. Using this example, partitioning, at 256 of FIG. 2B, the image construction component would iterate over the seven sections described based on this clustering partitioning.

Region Blockification

As noted above in regard to creating blocks of pixels, such as described in regard to 254 of FIG. 2B, the image construction component may create blocks in different ways. In some embodiments, the image construction component builds up an image one block at a time.

For example, in regard to FIG. 6, the region of the image to be constructed is depicted with a striped background with a polka dot pattern, and the training region is depicted with a white background and a polka dot pattern. In this example, the image is divided into blocks that are 16×16 pixels, such as blocks 602, 604 and 606.

In some embodiments, so long as a single pixel is undefined, the block encompassing the undefined pixel may be considered a block to be constructed. For example, in regard to FIG. 6, pixels above boundary 306 are undefined and pixels below boundary 306 are defined and may serve as part of the training region. Further, block 608 has most of its pixels below boundary 306, meaning that most of the pixels of block 306 are already defined to specify image information, however, given that at least some of block 306 is within the undefined pixel region, block 306 is a candidate for being entirely replaced with a constructed block.

However, in other embodiments, when a given block is defined over a threshold amount, for example, 85%, the image construction component may apply the construction process such that the block is considered a new sub-image.

In such an embodiment, the image construction component would use a smaller block sizes, and then apply the same algorithm for constructing the undefined, smaller blocks. In this example, once the sub-image (corresponding to an initial block of the original image) has been constructed, the sub-image may serve as a training block. In this way, useful pixel information from the original image is not discarded.

In other embodiments, as discussed above in regard to creating training partitions $\Omega_T^1$ through $\Omega_T^7$ and corresponding partitions to be constructed $\Omega_I^1$ through $\Omega_I^1$, in FIG. 5, the image construction component may divide each training partition and each partition to be constructed into blocks of pixels. The training region may include overlapping blocks. In this case, the training blocks may be represented as:

$$\mathcal{B}_{(\Omega_T^i;\Delta_T,L)}=\{B(x,y;L):(x=c\Delta_T)\wedge(y=r\Delta_T)\wedge(B(x,y;L)\cap\Omega_T^i=B(x,y;L))\}.$$

Further in this case, the blocks to be constructed may be represented as:

$$\mathcal{B}_{(\Omega_I^i;\Delta_I,L)}=\{B(x,y;L):(x=c\Delta_T)\wedge(y=r\Delta_T)\wedge(B(x,y;L)\cap\Omega_I^i\neq 0)\}.$$

In these equations, B(x, y; L) represents a block of size L by L pixels whose top left corner has pixel coordinates within the image of (x, y), and where B $(x, y; L)=\{(x+c, y+r)\in\mathbb{N}^2:(0\leq c\leq L-1)\wedge(0\leq r\leq L-1)\subset\mathcal{C}\}$, where $\mathcal{C}=\{(x,y)\in\mathbb{N}^2:(0\leq x\leq W-1)\wedge(0\leq y\leq H-1)\}$, where W and H represent the width and height of an image. In other words, C is the set of all pixels in the image, and the possible blocks B (x, y; L) allow x and y to range from the top left corner up until no more blocks of size L can be defined, in which case, blocks smaller than L are defined.

Integrating a Constructed Block

As discussed above in regard to FIG. 2, the image construction component may, after selecting a training block to serve as a basis for defining a block to be constructed, modify pixels in the neighborhood of the newly constructed block in order to create a smooth visual appearance between the newly constructed block and blocks in the neighborhood of the newly constructed block that are already defined or constructed.

Figure 7A:
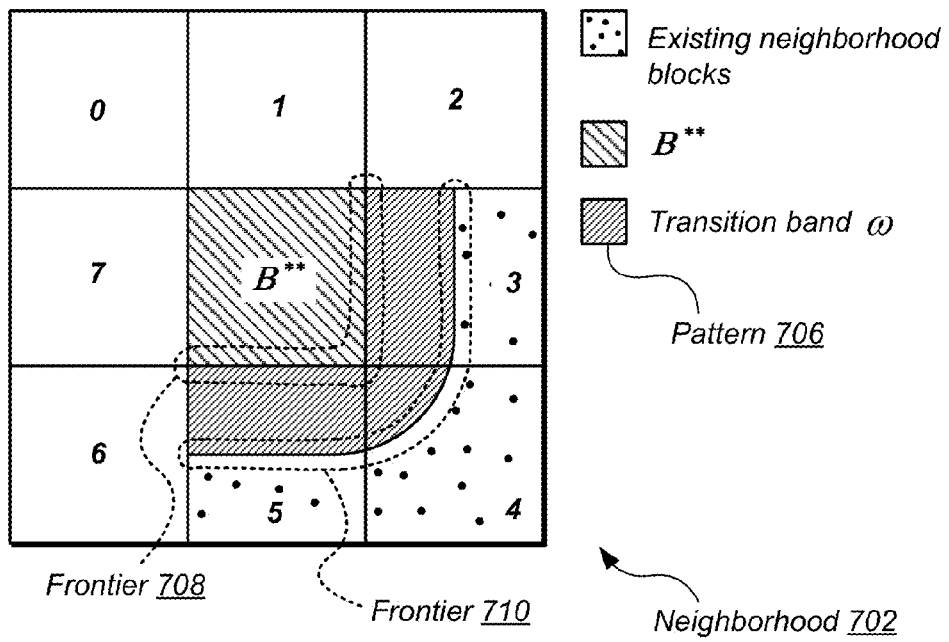
FIGS. 7A and 7B illustrate a neighborhood of pixels surrounding a block to be constructed and a neighborhood of pixels from a training region, according to some embodiments.
Figure 7B:
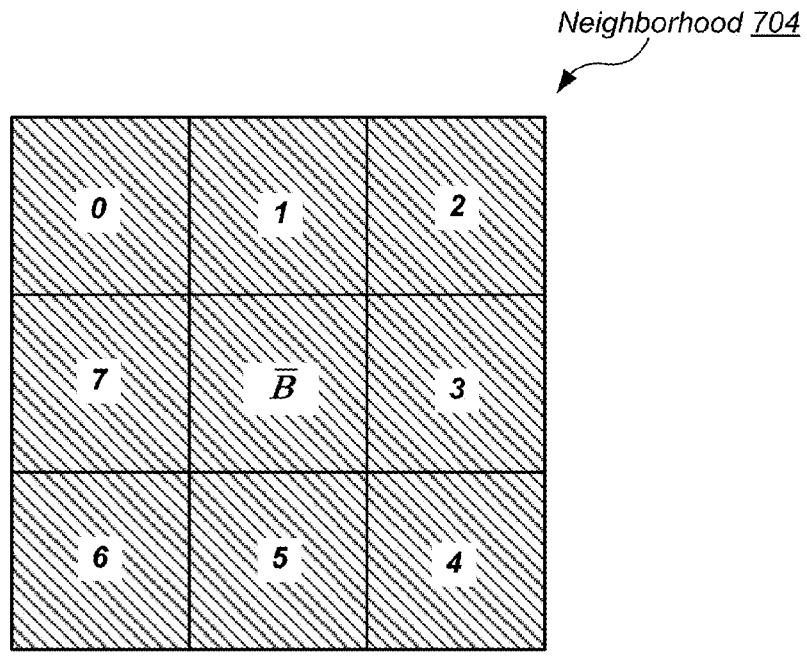

As depicted in FIG. 7, and neighborhood 702, block B is a newly defined block of pixels based on training block $\overline{B}$, where blocks 0, 1, 2, 6, and 7 surrounding block B remain undefined, and where blocks 3, 4, and 5 are blocks in the neighborhood 702 that were already defined before block B** is constructed.

With regard to previous descriptions of the block to be constructed, the block to be constructed has been represented as B*. In this example, B** is used to represent the constructed block of pixels based on block $\overline{B}$, which may be an exact duplicate of block $\overline{B}$ or a block that is based on block $\overline{B}$ but with some adjustments.

In this example, pattern 706 within neighborhood 702 depicts transition band $\omega$ between the newly constructed block at B and existing surrounding blocks 3, 4, and 5. The transition band $\omega$ includes pixels that are to be modified to blend block B with surrounding blocks 3, 4, and 5, where blocks 3, 4, and 5 are depicted with the polka dot pattern.

In this embodiment, only the pixels within the transition band are modified, but in other embodiments, pixels within block B** may also be modified. In other words, in other embodiments, the transition band may encompass pixels from the newly constructed block and the existing blocks of the neighborhood.

Further in this example, the color intensity of the pixels of $\overline{B}$ from the training neighborhood 704 are used as a basis in defining the color intensity of block B in neighborhood 702. In some cases, the color intensity of block B is set to equal the color intensity of block $\overline{B}$. In other embodiments, the color intensity of block B** may be an average of the color intensities of the surrounding, defined blocks, which are blocks 3, 4, and 5 in this example.

As discussed above, in many cases, because B is newly constructed the visual appearance of B may not blend in with the pixels of the existing blocks of neighborhood 702, which is where the transition band comes in. The image construction component may combine the information from B with the information of the existing surrounding blocks of B to create a seamless addition to the image.

In this embodiment, a blending technique is used to constrain both the color intensities and a gradient vector field, where the constrained intensities serve to ensure a smooth color transition, and where the constrained vector field serves to preserve the image detail.

In this embodiment, $\Gamma_{inner}$ may represent an internal frontier of the transition band, depicted as frontier 708, which is where the pixels from B meet the pixels from blocks 3, 4, and 5 of neighborhood 702, in other words, the inner edge of the transition band. Further, $\Gamma_{outer}$ may represent the external frontier of the transition band, depicted as frontier 710, which is where the pixels from the outer edge of the transition band meet the remaining pixels of the blocks 3, 4, and 5 of neighborhood 702**.

In this embodiment, the intensity values $I_\omega$ inside transition band ω, may be calculated to solve the following minimization problem:

$$\min_f \iint_\omega \|\nabla f(x,y;c) - v(x,y;c)\|^2 dxdy,$$

such that:

$$f(x,y;c)|_{(x,y) \in \Gamma_{inner}} = f_{B^{**}}(x,y;c)|_{(x,y) \in \Gamma_{inner}},$$

$$f(x,y;c)|_{(x,y) \in \Gamma_{outer}} = f^{\mathcal{N}}(\overline{B})(x,y;c)|_{(x,y) \in \Gamma_{outer}}, \text{ and}$$

$$v(x,y;c) = \frac{1}{2}(\nabla f_{B^{}}(x,y;c) + \nabla f_{B^{}}(x,y;c)).$$

Further in this example, c denotes an image channel.

Construction of a Neighborhood to Construct

In constructing a block, the image construction component may, in some embodiments, first select image content using information from the defined regions of the image, and then integrate the image content with the blocks neighboring the block to be constructed.

In regard to content selection, as discussed above, the image construction component may first select a next block, where the image construction component is able to identify a block to construct, $B^* \subset \Omega_I^i$, and its neighborhood, $\mathcal{N}(B^*)$. In this embodiment, the image construction component may use a data structure for finding a training area with a block with a close visual appearance to the neighborhood of the block to construct, $\mathcal{N}(B^*)$. As discussed above, closeness of visual appearance may be measured using a distance function between respective neighborhoods of the block to be constructed and the block in a training area.

As noted above, the image construction component may use various different types of data structures for different embodiments. As described above, the comparison of blocks of pixels may be a space and computationally intensive task. In this embodiment, a k-d tree, or k-dimensional tree, may be used and referred to as, $\mathcal{T}(\Omega_T^i; n(\mathcal{N}(B^*)))$. Further in this embodiment, the k-d tree may contain all the neighborhoods in $\Omega_T^i$ that have a configuration represented with the characteristic number; $n(\mathcal{N}(B^*))$.

A k-d tree may be a binary tree where every node is a k-dimensional point, and in this example, k may coincide with the dimensionality of a descriptor associated with a neighborhood that has characteristic number $n(\mathcal{N}(B^*))$. In other words, in some embodiments, $k=d|\mathcal{N}(B^*)|$.

While any searchable data structure capable of storing information on neighborhoods within the training area may be used, k-d trees are well-suited for quickly recovering a target block and neighborhood, where a block may be any collection or set of pixels in any shape. Given that a descriptor, discussed above, may capture the visual appearance of an image inside a neighborhood, a resulting training area neighborhood may bear a close resemblance to the visual appearance of the neighborhood, $\mathcal{N}(B^*)$, surrounding the block to be constructed.

In some embodiments, the k-d trees are lazily constructed at the point that a particular neighborhood configuration is needed. Further in this embodiment, for each training region, the image construction component may construct a forest composed of 256 k-d trees, where most of these k-d trees would be associated to neighborhood configurations that are not needed.

In short, in this embodiment, an overview for fetching a block and its neighborhood to construct may include (1) checking if the k-d tree $\mathcal{T}(\Omega_T^i; n(\mathcal{N}(B^*)))$ exists, and if not, create the k-d tree in response using blocks within $\mathcal{B}(\Omega_T^i; \Delta_I, L)$ and corresponding neighborhoods within $\Omega_T^i$ that have a same or nearly the same characteristic number $n(\mathcal{N}(B^*))$—in some embodiments, not only the neighborhood is included in the training region, but also the corresponding central block; and (2) querying $\mathcal{T}(\Omega_T^i; n(\mathcal{N}(B^*)))$ with the descriptor associated with the neighborhood $\mathcal{N}(B^*)$, where the retrieved neighborhood may become neighborhood $\mathcal{N}$ and $\overline{B}$ may become the central block for neighborhood $\mathcal{N}$.

In some embodiments, to introduce variability into the constructed block, the image construction component may pick, instead of the closest match to a similarity query, a randomly selected match that is among a set of nearest neighbors, for example, say a configurable number of nearest neighbors.

Embodiment of an Image Construction Component

In addition to the discussion accompanying the flowchart of FIG. 2, another way to view the elements of the manner in which an embodiment of an image construction component constructs blocks is presented with the below algorithm.

Similar to the overall operation discussed above in regard to FIG. 2, the below table lists an algorithm that iterates over each of the partitions of an image (beginning at line 1), such as the partitions described in regard to FIGS. 3 and 5, and an inner loop iterates over each of the blocks within a given partition (beginning at line 2). In this way, in this example, each partition of the regions to be constructed in an image and each block within each partition are processed and constructed.

In this embodiment, lines 3-9 correspond to operations performed within the while loop at line 2, which is iterating over blocks in the current partition. Further in this example, beginning at line 3, the image construction component may select a next block, B*, from among $\mathcal{B}(\Omega_T^i; \Delta_I, L)$, which represents the blocks within the current partition. Once the block, B*, has been selected, the image construction component may compute a descriptor, D*, for the neighborhood surrounding block B*, represented as $\mathcal{N}$ (B*), as depicted beginning at line 4.

In this embodiment, as listed beginning at line 5, if a k-d tree does not exist for the training region, $\Omega_T^i$, corresponding to the current partition to be constructed, $\Omega_I^i$, then in response the image construction component may construct a k-d tree, $\mathcal{T}$ ($\Omega_T^i$;n($\mathcal{N}$ (B*))), as depicted beginning at line 5. Given a k-d tree $\mathcal{T}$ ($\Omega_T^i$;n($\mathcal{N}$ (B*))) for the current training region, the image construction component may query the k-d tree $\mathcal{T}$ ($\Omega_T^i$;n($\mathcal{N}$ (B*))) using descriptor D*, where descriptor D* may be associated with the neighborhood of the block to construct, $\mathcal{N}$ (B*), and from this query the image construction component may recover a block $\overline{B}$ within the training region, as depicted beginning at line 6.

Once the block $\overline{B}$ within the training region has been determined, the image construction component may then construct the visual appearance of $\overline{B}$ into the block to be constructed, B*, as depicted at line 7. In some embodiments, the visual appearance of the block to be constructed is a copy of the training block, and in other cases, the visual appearance of the block to be constructed is based on the training block, but includes some visual modifications, such as colors, intensity, or other visual characteristics.

Given the constructed block, the image construction component may then visually integrate the newly constructed block with the neighboring blocks, $\mathcal{N}$ (B*), as depicted beginning at line 8. This blending may be performed according to the methods described above in regard to FIG. 7.

Once the block to be constructed has been constructed and the neighboring blocks have been visually blended with the newly constructed block, the image construction component may remove the newly constructed block, B*, from consideration, as depicted beginning at line 9. In other words, block B* may be removed from a set of blocks to be constructed in the current region to be constructed, where this removal may be represented as, $\Omega_I^i$: $\mathfrak{B}$ ($\Omega_I^i$;$\Delta_I$,L)← $\mathfrak{B}$ ($\Omega_I^i$;$\Delta_I$,L)\B*.

As noted above, once the image construction component iterates over all the partitions of an image to be constructed and iterates over the blocks within each of the partitions of the image to be constructed, the resulting image may be fully defined with no areas that lack pixel information.

TABLE 1

| 1 | for i ← 1 to $N_I$ { // iterate over the partitions of an image |
| --- | --- |
| 2 | while ($\Omega_I^i$; $\Delta_I$, L) ≠ ∅ { // iterate over the blocks in a given partition |
| 3 | • select a next block B* ∈ $\mathfrak{B}$ ($\Omega_I^i$; $\Delta_I$, L) to visually construct |
| 4 | • compute descriptor D* for neighborhood $\mathcal{N}$ (B*) |
| 5 | • if $\nexists\mathcal{T}$($\Omega_T^i$; n($\mathcal{N}$(B*))) then construct k-d tree $\mathcal{N}$ ($\Omega_T^i$; n($\mathcal{N}$ (B*))) |
| 6 | • query the k-d tree ($\Omega_T^i$ ; n( (B*))) using descriptor D* associated with the neighborhood $\mathcal{N}$ (B*) to recover block $\overline{B}$ |
| 7 | • copy visual appearance of $\overline{B}$ into B* |
| 8 | • blend the neighborhood $\mathcal{N}$ (B*) with $\mathcal{N}$ ($\overline{B}$) |
| 9 | • remove block B* from the set of blocks to be constructed in the region $\Omega_I^i$: $\mathfrak{B}$ ($\Omega_I^i$; $\Delta_I$, L) ← $\mathfrak{B}$ ($\Omega_I^i$; $\Delta_I$, L) \ B* |

TABLE 1-continued

| 10 | } // end while loop |
| --- | --- |
| 11 | } // end for loop |

Example Computer System

Figure 10:
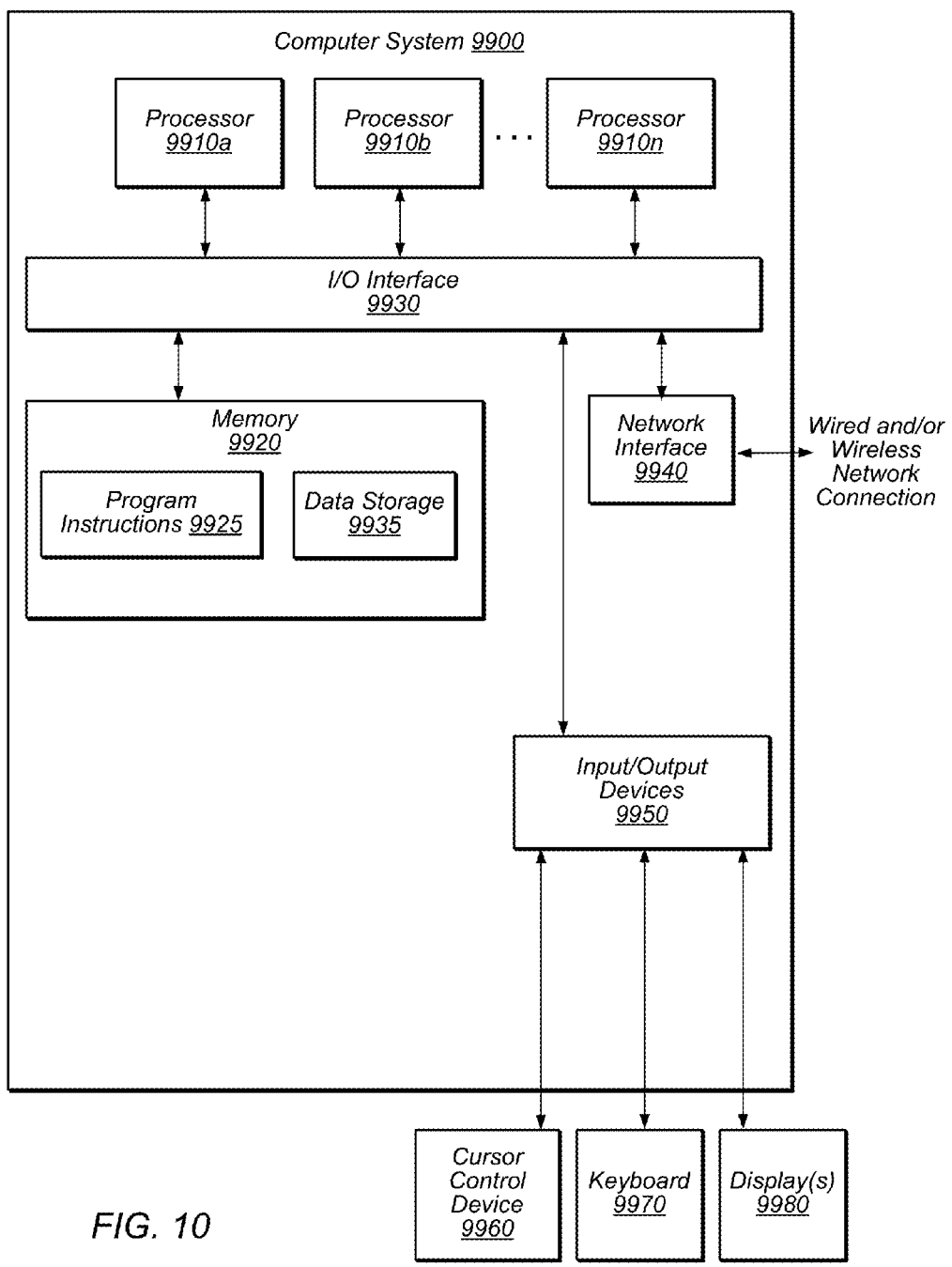
FIG. 10 depicts selected elements of an example computer system capable of implementing the various embodiments of an image construction component.

FIG. 10 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9360*a*-9360*n* coupled to system memory 9370 via input/output (I/O) interface 9380. The computer system further includes network interface 9390 coupled to I/O interface 9380, and one or more input/output devices 9382, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s).

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9370 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. A non-transitory, computer-readable storage medium may include storage media or memory media such as magnetic or optical media such as disks or DVD/CD-ROM, volatile or non-volatile media such as RAM, ROM, and flash drives. More generally, computer-accessible or computer-readable storage media may also include transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by one or more computing devices:
identifying one or more source regions and one or more target regions of an image, wherein individual ones of the one or more source regions comprise respective defined pixel information including a respective plurality of source blocks of pixels, wherein individual ones of the one or more target regions correspond to respective ones of the one or more source regions, and wherein individual ones of the one or more target regions comprise a respective plurality of target blocks of pixels;
selecting, from among the plurality of target blocks of pixels within a target region of the one or more target regions, a target block of pixels, wherein one or more of the target blocks of pixels are surrounded by one or more blocks of pixels to be defined and one or more blocks of pixels with existing pixel information, and wherein the selected target block of pixels is selected based on the selected target block of pixels being surrounded by a number of neighboring blocks with existing pixel information that is greater than a number of neighboring blocks with existing pixel information surrounding other target blocks of the plurality of target blocks;
computing one or more visual characteristics of the one or more blocks of pixels with existing pixel information surrounding the target block of pixels based, at least in part, on geometric and color information of the one or more blocks of pixels, wherein the computing of at least one of the one or more visual characteristics is based at least in part on a plurality of pixel values;
determining a search descriptor comprising the one or more computed visual characteristics, the search descriptor suitable to identify other blocks of pixels with visual characteristics similar to the one or more computed visual characteristics;
searching, using the search descriptor, from among the plurality of source blocks of pixels within a source region corresponding to the target region comprising the target block of pixels for a source block of pixels with surrounding blocks of pixels that are similar to the one or more blocks of pixels surrounding the target block of pixels, wherein the similarity is based on the one or more visual characteristics of the search descriptor, and wherein the source block of pixels is selected from the plurality of source blocks of pixels for the source region;
defining pixel information for the target block of pixels within the image, wherein the pixel information for the target block of pixels is based on the selected source block of pixels; and
repeating, for the plurality of target blocks of pixels of the target region, said selecting, computing, determining, searching, and defining.

2. The method of claim 1, wherein said defining pixel information for the target block of pixels further comprises:
determining, one or more visual characteristics of the one or more blocks of pixels surrounding the source block of pixels corresponding to the blocks of pixels surrounding the target block of pixels; and
modifying, based on one or more visual characteristics of the one or more blocks surrounding the source block of pixels, one or more of the pixels within the one or more blocks of pixels with existing information surrounding the target block of pixels.

3. The method of claim 2, wherein said modifying the one or more of the pixels within the one or more blocks of pixels with existing pixel information surrounding the target block of pixels comprises blending pixel information from the existing pixel information surrounding the target block of pixels and from the one or more blocks of source pixels with existing pixel information surrounding the source block of pixels.

4. The method of claim 1, wherein said identifying the one or more source regions and the one or more target regions comprises:
partitioning the image into the one or more source regions;
partitioning the image into the one or more target regions;
dividing each of the one or more source regions into a respective plurality of source blocks of pixels; and
dividing each of the one or more target regions into a respective plurality of target blocks of pixels.

5. The method of claim 4, further comprising:
determining, for each respective source block of the plurality of source blocks, a respective descriptor capturing one or more elements of pattern information within the respective source block; and
determining, for each respective target block of the plurality of target blocks, a respective descriptor capturing one or more elements of pattern information within the respective target block.

6. The method of claim 1, wherein said determining the source block of pixels further comprises:
selecting the source block of pixels based on one or more distance function values between the one or more blocks of source pixels with existing pixel information and the one or more blocks of pixels with existing pixel information surrounding the target block of pixels.

7. A system, comprising:
a computing device comprising at least one processor; and
a memory comprising program instructions, wherein the memory is coupled to the at least one processor, and wherein the program instructions are executable by the at least one processor to:
identify one or more source regions and one or more target regions of an image, wherein individual ones of the one or more source regions comprise respective defined pixel information including a respective plurality of source blocks of pixels, wherein individual ones of the one or more target regions correspond to respective ones of the one or more source regions, and wherein individual ones of the one or more target regions comprise a respective plurality of target blocks of pixels;
select, from among the plurality of target blocks of pixels within a target region of the one or more target regions, a target block of pixels, wherein one or more of the target blocks of pixels are surrounded by one or more blocks of pixels to be defined and one or more blocks of pixels with existing pixel information, and wherein the selected target block of pixels is selected based on the selected target block of pixels being surrounded by a number of neighboring blocks with existing pixel information that is greater than a number of neighboring blocks with existing pixel information surrounding other target blocks of the plurality of target blocks;

compute one or more visual characteristics of the one or more blocks of pixels with existing pixel information surrounding the target block of pixels based, at least in part, on geometric and color information of the one or more blocks of pixels, wherein the computation of at least one of the one or more visual characteristics is based at least in part on a plurality of pixel values;

determine a search descriptor comprising the one or more computed visual characteristics, the search descriptor suitable to identify other blocks of pixels with visual characteristics similar to the one or more computed visual characteristics;

search, using the search descriptor, from among the plurality of source blocks of pixels within a source region corresponding to the target region comprising the target block of pixels for a source block of pixels with surrounding blocks of pixels that are similar to the one or more blocks of pixels surrounding the target block of pixels, wherein the similarity is based on the one or more visual characteristics of the search descriptor, and wherein the source block of pixels is selected from the plurality of source blocks of pixels for the source region;

define pixel information for the target block of pixels within the image, wherein the pixel information for the target block of pixels is based on the selected source block of pixels; and repeat, for the plurality of target blocks of pixels of the target region, said select, determine, search, and define.

8. The system of claim 7, wherein, to identify the one or more source regions and the one or more target regions, the program instructions are further executable to:

partition the image into the one or more source regions; and partition the image into the one or more target regions.

9. The system of claim 8, wherein, to identify the one or more source regions and the one or more target regions, the program instructions are further executable to:

divide each of the one or more source regions into a respective plurality of source blocks of pixels; and divide each of the one or more target regions into a respective plurality of target blocks of pixels.

10. The system of claim 9, wherein the program instructions are further executable to:

determine, for each respective source block of the plurality of source blocks, a respective descriptor capturing one or more elements of pattern information within the respective source block; and determine, for each respective target block of the plurality of target blocks, a respective descriptor capturing one or more elements of pattern information within the respective target block.

11. The system of claim 7, wherein to determine the source block of pixels, the program instructions are further executable to:

select the source block of pixels based on one or more distance function values between the one or more blocks of source pixels with existing pixel information and the one or more blocks of pixels with existing pixel information surrounding the target block of pixels.

12. The system of claim 7, wherein to modify the one or more of the pixels within the one or more blocks of pixels with existing pixel information surrounding the target block of pixels, the program instructions are further executable to blend pixel information from the existing pixel information surrounding the target block of pixels and from the one or more blocks of source pixels with existing pixel information surrounding the source block of pixels.

13. A non-transitory, computer-readable storage medium storing program instructions, wherein the program instructions are computer-executable to implement:

identifying one or more source regions and one or more target regions of an image, wherein individual ones of the one or more source regions comprise respective defined pixel information including a respective plurality of source blocks of pixels, wherein individual ones of the one or more target regions correspond to respective ones of the one or more source regions, and wherein individual ones of the one or more target regions comprise a respective plurality of target blocks of pixels;

selecting, from among the plurality of target blocks of pixels within a target region of the one or more target regions, a target block of pixels, wherein one or more of the target blocks of pixels are surrounded by one or more blocks of pixels to be defined and one or more blocks of pixels with existing pixel information, and wherein the selected target block of pixels is selected based on the selected target block of pixels being surrounded by a number of neighboring blocks with existing pixel information that is greater than a number of neighboring blocks with existing pixel information surrounding other target blocks of the plurality of target blocks;

computing one or more visual characteristics of the one or more blocks of pixels with existing pixel information surrounding the target block of pixels based, at least in part, on geometric and color information of the one or more blocks of pixels, wherein the computing of at least one of the one or more visual characteristics is based at least in part on a plurality of pixel values;

determining a search descriptor comprising the one or more computed visual characteristics, the search descriptor suitable to identify other blocks of pixels with visual characteristics similar to the one or more computed visual characteristics;

searching, using the search descriptor, from among the plurality of source blocks of pixels within a source region corresponding to the target region comprising the target block of pixels for a source block of pixels with surrounding blocks of pixels that are similar to the one or more blocks of pixels surrounding the target block of pixels, wherein the similarity is based on the one or more visual characteristics of the search descriptor, and wherein the source block of pixels is selected from the plurality of source blocks of pixels for the source region;

modifying, based on one or more visual characteristics of the one or more blocks surrounding the selected source block of pixels, one or more of the pixels within the one or more blocks of pixels with existing information surrounding the target block of pixels; and defining pixel information for the target block of pixels within the image, wherein the pixel information for the target block of pixels is based on the source block of pixels; and repeating, for the plurality of target blocks of pixels of the target region, said selecting, determining, searching, and defining.

14. The non-transitory, computer-readable storage medium of claim 13, wherein said identifying the one or more source regions and one or more target regions comprises:

partitioning the image into the one or more source regions; and partitioning the image into the one or more target regions.

15. The non-transitory, computer-readable storage medium of claim 14, wherein said identifying the one or more source regions and the one or more target regions comprises:

dividing each of the one or more source regions into a respective plurality of source blocks of pixels, wherein the source block of pixels is selected from the plurality of source blocks of pixels; and dividing each of the one or more target regions into a respective plurality of target blocks of pixels, and wherein the target block of pixels is selected from the plurality of target blocks of pixels.

16. The non-transitory, computer-readable storage medium of claim 15, wherein the program instructions are computer-executable to further implement:

determining, for each respective source block of the plurality of source blocks, a respective descriptor capturing one or more elements of pattern information within the respective source block; and determining, for each respective target block of the plurality of target blocks, a respective descriptor capturing one or more elements of pattern information within the respective target block.

17. The non-transitory, computer-readable storage medium of claim 13, wherein the program instructions are computer-executable to further implement:

selecting the source block of pixels based on one or more distance function values between the one or more blocks of source pixels with existing pixel information and the one or more blocks of pixels with existing pixel information surrounding the target block of pixels.

* * * * *